(12) United States Patent
Marosz (10) Patent No.: US 10,003,222 B2
(45) Date of Patent: Jun. 19, 2018

(54) DUAL-ACCUMULATOR ELECTRICAL GENERATION APPARATUS

(71) Applicant: Marion J. Marosz, Mission Viejo, CA (US)

(72) Inventor: Marion J. Marosz, Mission Viejo, CA (US)

( * ) Notice: Subject to any disclaimer, the term of this patent is extended or adjusted under 35 U.S.C. 154(b) by 0 days. days.

(21) Appl. No.: 15/347,538

(22) Filed: Nov. 9, 2016

(65) Prior Publication Data

US 2017/0141626 A1    May 18, 2017

Related U.S. Application Data

(60) Provisional application No. 62/254,537, filed on Nov. 12, 2015.

(51) Int. Cl.
| | | |
|---|---|---|
| *H02K 16/04* | (2006.01) | |
| *H02K 1/14* | (2006.01) | |
| *H02K 1/08* | (2006.01) | |
| *H02K 7/18* | (2006.01) | |

(52) U.S. Cl.
CPC .............. *H02K 1/143* (2013.01); *H02K 1/08* (2013.01); *H02K 7/1807* (2013.01)

(58) Field of Classification Search
CPC ........ H02K 1/143; H02K 1/08; H02K 7/1807; H02K 16/00; H02K 16/04
See application file for complete search history.

(56) References Cited

U.S. PATENT DOCUMENTS

| | | | | |
|---|---|---|---|---|
| 1,929,259 A | * | 10/1933 | Rich ...................... | G01R 23/02 324/163 |
| 2,048,375 A | * | 7/1936 | Dunham ................ | H02K 21/20 310/156.65 |
| 2,081,800 A | | 5/1937 | Dunham et al. | |
| 2,202,051 A | * | 5/1940 | Gillen .................... | H02K 21/28 310/46 |
| 2,317,187 A | | 4/1943 | Griffiths | |
| 3,256,453 A | | 6/1966 | Haydon | |
| 3,396,296 A | * | 8/1968 | Esters ................... | H02K 99/00 310/266 |
| 3,579,455 A | | 5/1971 | Ingenito | |
| 3,688,306 A | * | 8/1972 | Oishi ................... | G01D 5/2457 310/168 |

(Continued)

FOREIGN PATENT DOCUMENTS

WO    WO9315547    8/1993

OTHER PUBLICATIONS

The International Search Report and the Written Opinion of the International Searching Authority, or the Declaration, dated Mar. 24, 2017, 12 pages.

*Primary Examiner* — Dang Le (74) *Attorney, Agent, or Firm* — Stetina Brunda Garred & Brucker (57) ABSTRACT

An apparatus for converting mechanical energy into electrical energy includes a rotor having a first end portion and a second end portion, a first stator including a plurality of magnet poles, and a second stator including a plurality of magnet poles. The rotor is located about a shaft along a rotational axis. The rotor includes a plurality of north and south poles alternating along a circumference of the rotor. The plurality of magnet poles of the first stator are rotated 180 electrical degrees with respect to the plurality of magnet poles of the second stator.

11 Claims, 11 Drawing Sheets

(56) References Cited

U.S. PATENT DOCUMENTS

| | | | |
|---|---|---|---|
| 3,878,414 A | | 4/1975 | Harakawa |
| 4,017,851 A | | 4/1977 | Felice |
| 4,048,548 A | | 9/1977 | Nakajima et al. |
| 4,088,909 A | | 5/1978 | Matsumura et al. |
| 4,114,057 A | * | 9/1978 | Esters .................. H02K 23/00 310/154.23 |
| 4,214,181 A | | 7/1980 | Nagahori |
| 4,329,601 A | | 5/1982 | Mai |
| 4,386,287 A | | 5/1983 | Karasawa et al. |
| 4,441,043 A | * | 4/1984 | DeCesare ............. H02K 19/00 310/112 |
| 4,518,884 A | | 5/1985 | Chatelain |
| 5,281,879 A | | 1/1994 | Satake |
| 5,349,257 A | * | 9/1994 | Hernden ................ H02K 19/28 310/156.12 |
| 5,504,382 A | * | 4/1996 | Douglass ............... H02K 1/278 310/114 |
| 5,874,798 A | | 2/1999 | Wiegele |
| 6,169,350 B1 | * | 1/2001 | Yang ..................... H02K 1/14 310/13 |
| 6,657,353 B1 | * | 12/2003 | Patarchi ................ H02K 21/12 310/185 |
| 6,998,747 B2 | * | 2/2006 | Kujirai ................ G01D 5/2046 310/112 |
| 7,579,742 B1 | * | 8/2009 | Rittenhouse ........... H02K 1/141 310/257 |
| 7,982,352 B2 | * | 7/2011 | Nymann ................ H02K 21/24 310/114 |
| 8,552,607 B2 | | 10/2013 | Chan |
| 8,901,761 B2 | | 12/2014 | Hemmelmann |
| 2012/0126731 A1 | | 5/2012 | Wyrembra |
| 2016/0233731 A1 | | 8/2016 | Shepard |

* cited by examiner

FIG. 12 ns field of electrical then a south pole. Each stator armature is formed of a stack of magnetic steel laminations in a ring shape and includes a plurality of magnetic poles disposed on the inner circumference of the stator armature. The poles of the first and second stators, respectively, are located to match the position of every other pole of the rotor.

According to another aspect of the present disclosure, an apparatus for converting mechanical energy into electrical energy includes a rotor having a first end portion and a second end portion, a first stator including a plurality of magnet poles, and a second stator including a plurality of magnet poles. The rotor is located about a shaft along a rotational axis. The rotor includes a plurality of north and south poles alternating along a circumference of the rotor. The plurality of magnet poles of the first stator are rotated 180 electrical degrees with respect to the plurality of magnet poles of the second stator.

The plurality of magnetic poles of the first stator may be disposed at angular intervals on an inner circumference of the first stator. The plurality of magnetic poles of the second stator may be disposed at angular intervals on an inner circumference of the second stator. The plurality of magnet poles of the first stator may be interleafed with the plurality of magnet poles of the second stator.

According to another aspect of the present disclosure, an apparatus for converting mechanical energy into electrical energy includes a rotor located about a shaft along a rotational axis, an output coil bridge, and a dual stator. The rotor has a plurality of poles. The dual stator includes a first stator having a plurality of magnet poles and a second stator having a plurality of magnet poles. The dual stator is magnetically coupled to the output coil bridge. The plurality of magnet poles of the first stator and the plurality of magnet poles of the second stator are proximal to the plurality of poles of the rotor, such that when a magnetic field is generated on the plurality of poles of the rotor, the first stator receives magnetic flux of all a first magnetic polarity and the second stator receives magnetic flux of all a second magnetic polarity.

According to another aspect of the present disclosure, an apparatus for converting mechanical energy into electrical energy includes a first dual stator, a second dual stator, a third dual stator, and a rotor. The rotor has a plurality of poles along a circumference of the rotor. When the rotor rotates, the first dual stator is magnetically coupled to a first output coil bridge, the second dual stator is magnetically coupled to a second output coil bridge, and the third dual stator is magnetically coupled to a third output coil bridge.

BRIEF DESCRIPTION OF THE DRAWINGS

These and other features and advantages of the dual-stator electrical generation apparatus embodiments disclosed herein will be better understood with respect to the following description and drawings, in which like reference numerals may refer to similar or identical elements throughout the description of the figures, and in which.

DETAILED DESCRIPTION

Hereinafter, embodiments of a dual-stator electrical generation apparatus and methods for constructing the same are described with reference to the accompanying drawings.

This description may use the phrases "in an embodiment," "in embodiments," "in some embodiments," or "in other embodiments," which may each refer to one or more of the same or different embodiments in accordance with the present disclosure. Various features of the embodiments disclosed herein can be used alone, or in varying combinations with each other and are not intended to be limited to the specific combinations described herein.

As used herein, the term "electrical alternator" or simply "alternator" generally refers to alternating current (AC) electrical generators. As used herein, "eddy currents" generally refers to loops of electrical current induced within structure by a changing magnetic field. As used herein, the term "electrical steel" generally refers to steel with silicon added to it. As used herein, the term "hysteresis" generally refers to the residual magnetic field when magnetic excitation is removed or decreased. As it is used in this description, "transmission line" generally refers to any transmission medium that can be used for the propagation of signals from one point to another. It is to be understood that the terminology used herein is for the purpose of describing particular embodiments only, and is not intended to be limiting.

In the presently-disclosed electrical generation apparatus embodiments, the armature is the stator, which comprises two or more parts. Various embodiments of the present disclosure provide a dual-stator electrical generation apparatus for converting mechanical energy into electrical energy including a rotor and dual stators. During operation of the presently-disclosed dual-stator electrical generation apparatus, as the rotor rotates, one armature ring (e.g., the first stator) will receive the magnetic flux of all the first magnetic polarity, e.g., north (N) polarity, poles of the rotor, and the other armature ring (e.g., the second stator) will receive all of the magnetic flux of the second magnetic polarity, e.g., south (S) polarity, poles of the rotor. The presently-disclosed dual-stator electrical generation apparatus may be simpler than the construction of the typical electrical alternator and/or provide significantly higher efficiency than prior art alternators.

Figure 1:
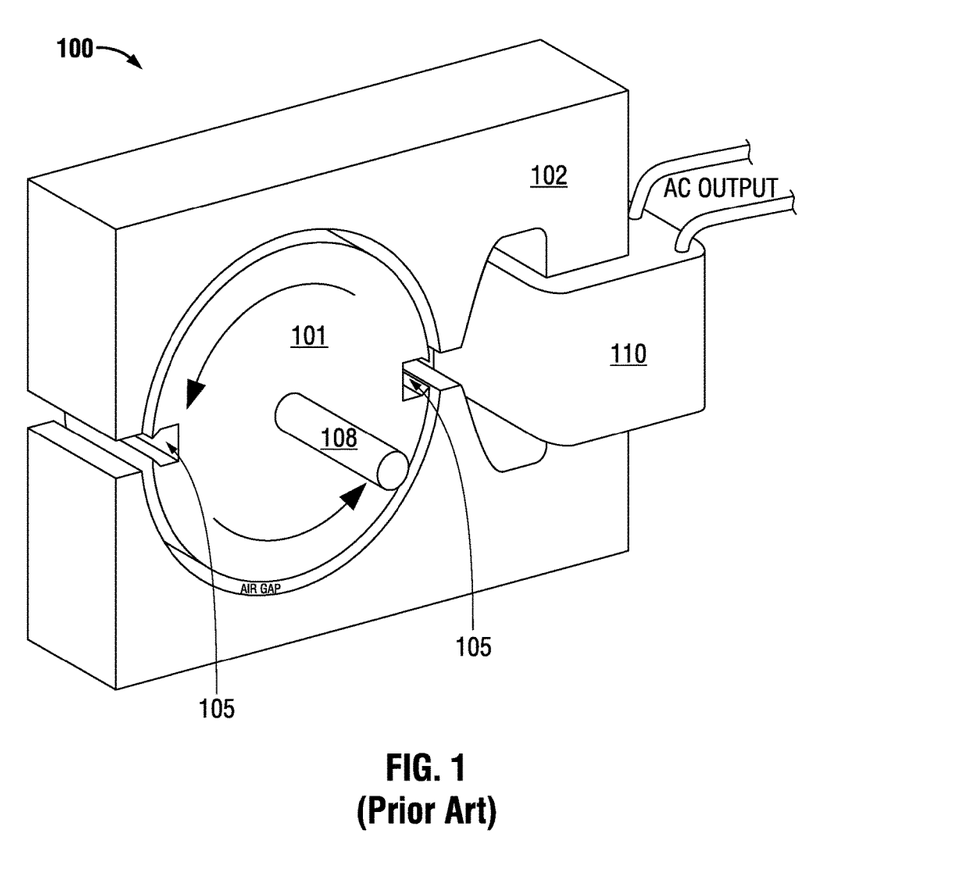
FIG. 1 is a perspective view of a two-pole alternator.

When compared to a two-pole alternator (e.g., alternator 100 shown in FIG. 1) of equal size, e.g., equal rotor diameter and total rotor flux, the presently-disclosed dual-stator electrical generation apparatus is capable of producing the same output as the two-pole alternator with the same amount of torque but at a significantly lower rpm.

Figure 4:
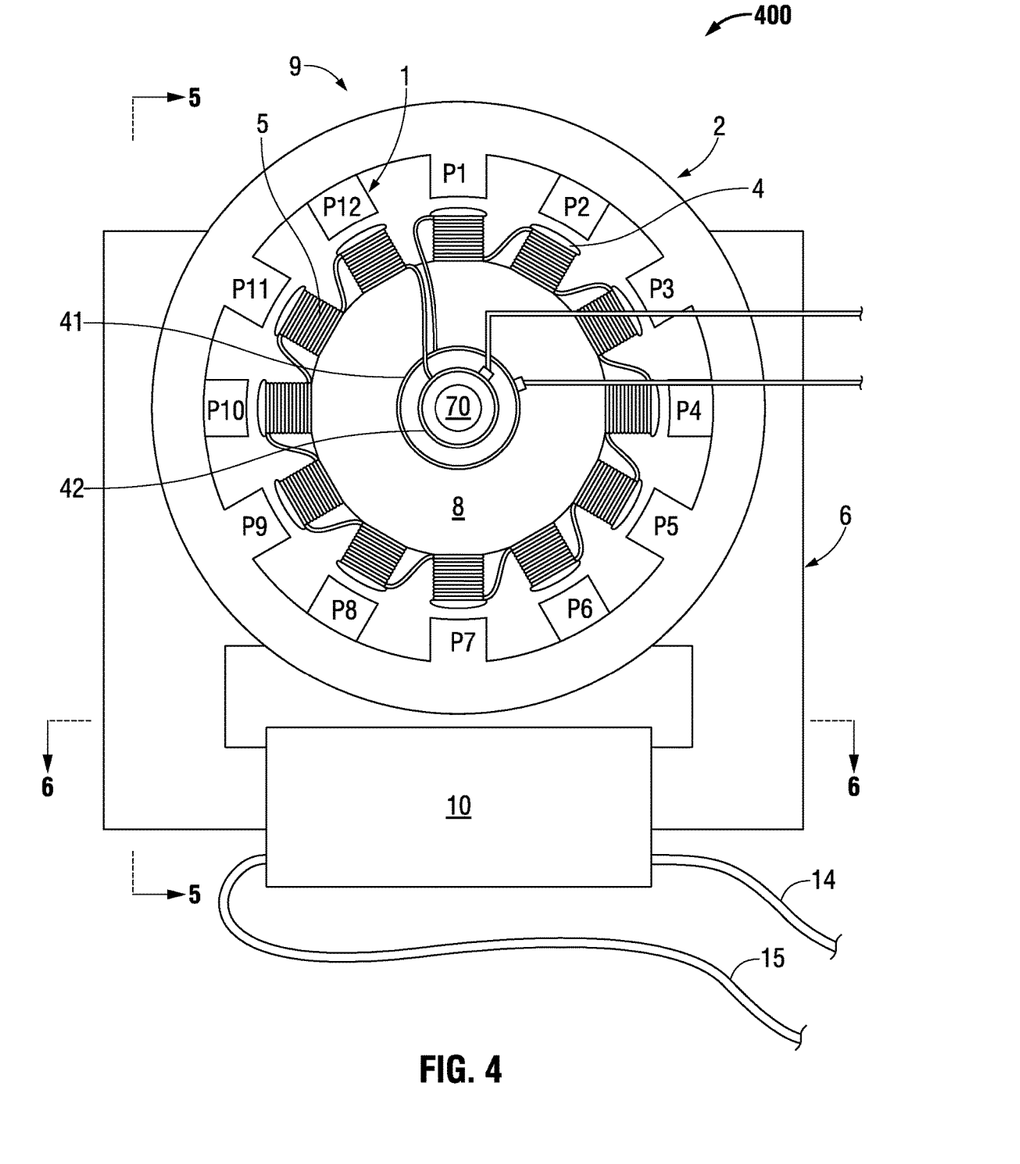
FIG. 4 is a schematic view of a dual-stator electrical generation apparatus in accordance with an embodiment of the present disclosure.
Figure 12:
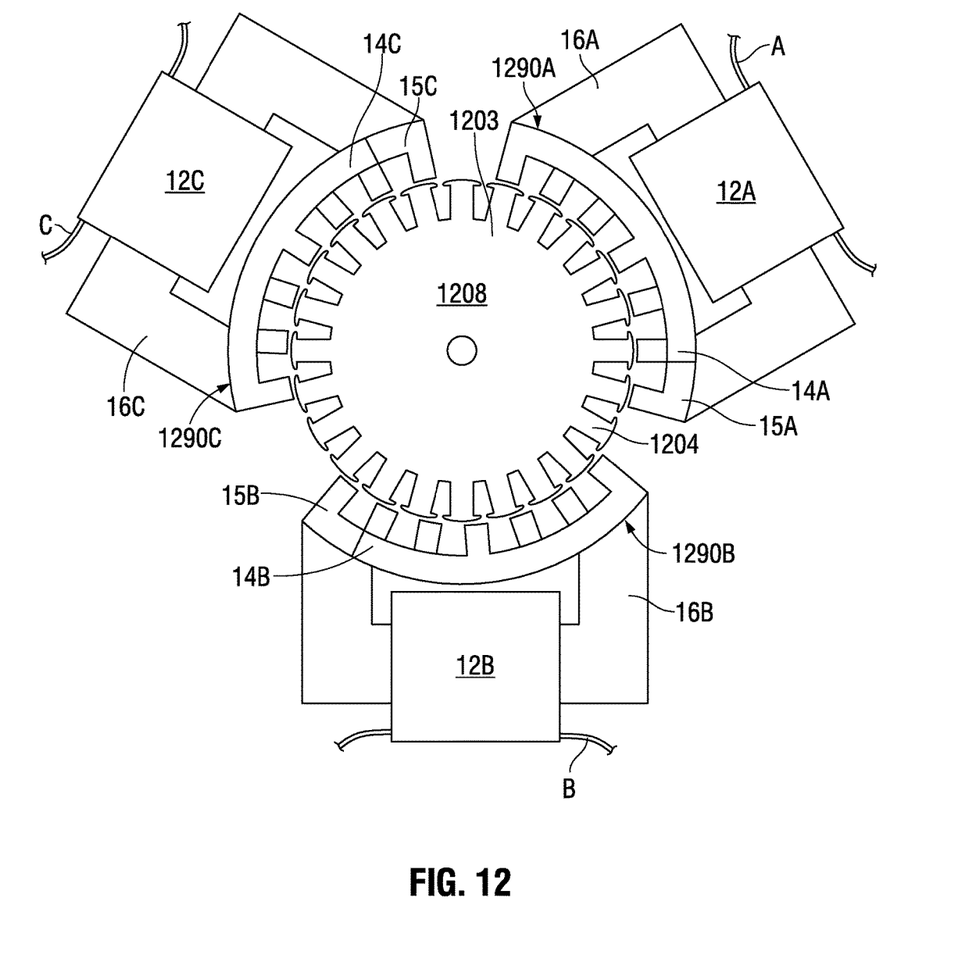
FIG. 12 is a schematic view of a three-phase dual-stator electrical generation apparatus in accordance with an embodiment of the present disclosure.

Although the present disclosure provides methods for constructing single-phase electrical power generation apparatus (e.g., single-phase, dual-stator electrical generation apparatus 400 shown in FIG. 4) and three-phase electrical power generation apparatus (e.g., three-phase, dual-stator electrical generation apparatus 1200 shown in FIG. 12), those skilled in the art will recognize that various polyphase electrical power generation apparatus can be constructed using the presently-disclosed concepts and principles.

FIGS. 2A, 2B and 3-8 show an embodiment of a single-phase, dual-stator electrical generation apparatus, or components thereof. In the illustrated embodiment, the dual-stator electrical generation apparatus (shown generally as 400 in FIG. 4) includes a dual stator 9 comprising a first stator 1 and a second stator 2, in which a rotor 8 is concentrically disposed. In FIGS. 2C and 2D, two alternative embodiments of the dual stator 9 are shown.

In some embodiments, the magnetic field on the rotor 8 is generated by current delivered through slip rings 41 and 42. In other embodiments, the magnetic field on the rotor 8 may be generated by permanent magnets. Various parts of the dual-stator electrical generation apparatus 400 may be formed of any of a variety of materials, including metallic and/or non-metallic materials. One or more parts of the dual-stator electrical generation apparatus 400 may be constructed from thin lamination sheets stacked together, e.g., to reduce eddy current losses. The rotor 8 and the dual stator 9, or portions thereof, may be fabricated out of electrical steel, e.g., to improve the magnetic flux strength and reduce hysteresis loss.

Figure 2A:
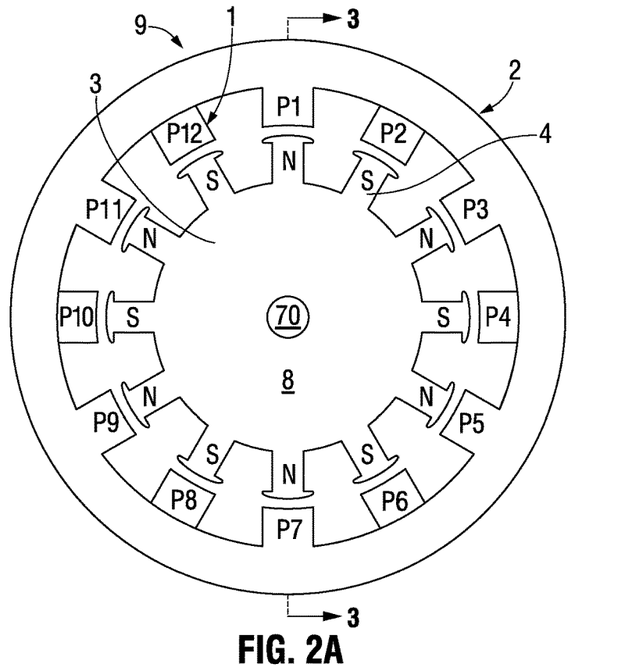
FIG. 2A is a schematic view of a rotor and first and second stators of a dual-stator electrical generation apparatus, shown in a first configuration, in accordance with an embodiment of the present disclosure.
Figure 2B:
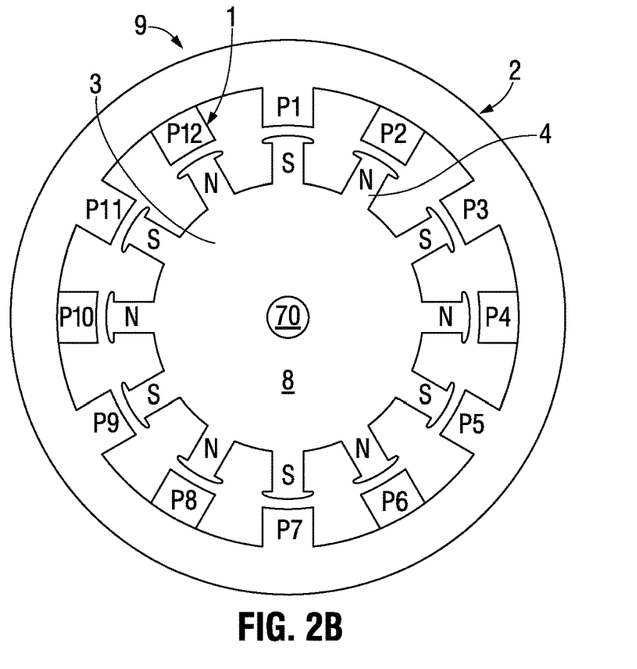
FIG. 2B is a schematic view of the rotor and first and second stators of FIG. 2A, shown in a second configuration, in accordance with an embodiment of the present disclosure.
Figure 2C:
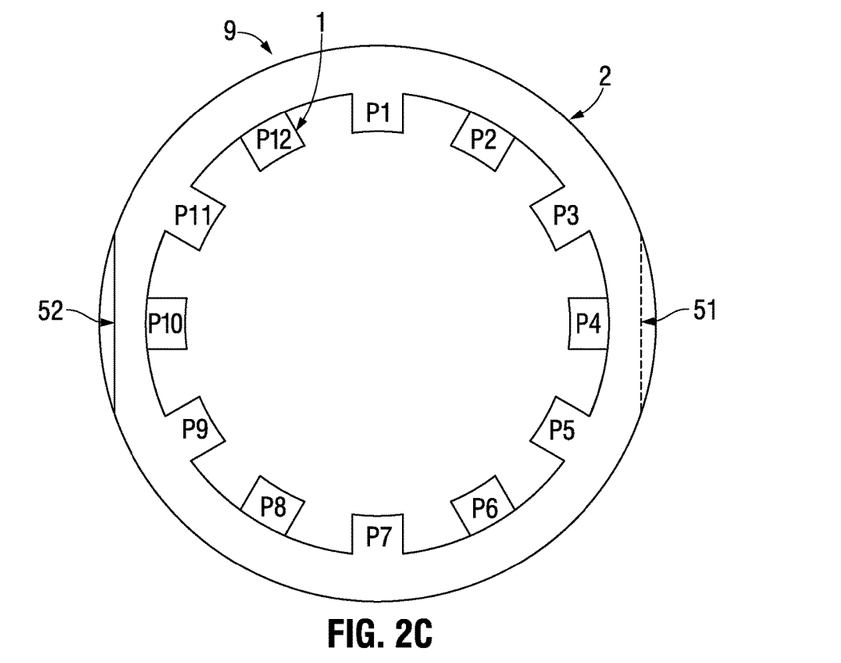
FIG. 2C is a schematic view of an alternative embodiment of the first and second stators of FIG. 2A in accordance with the present disclosure.
Figure 2D:
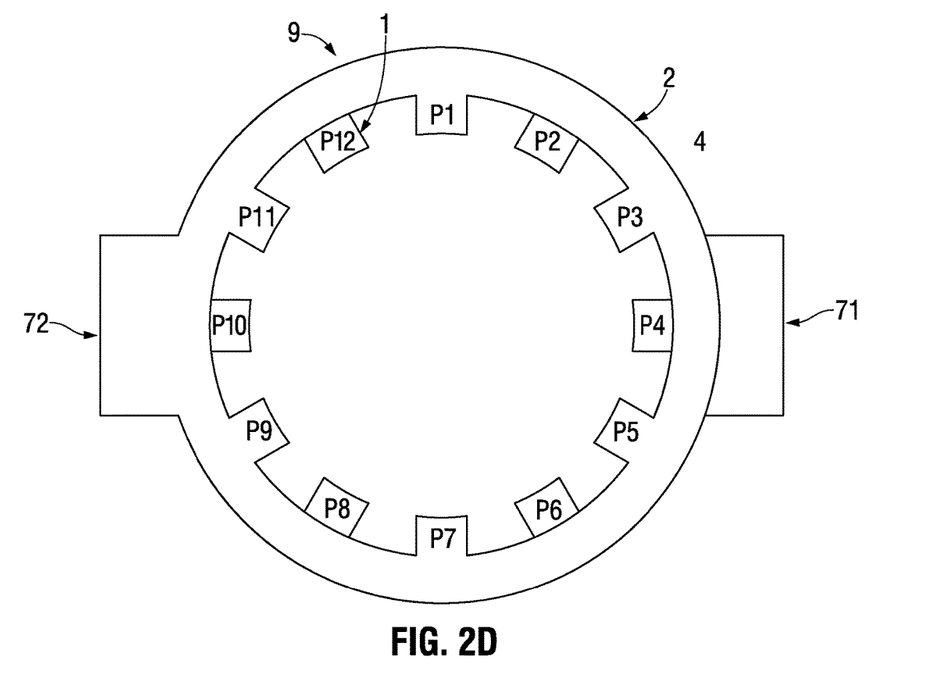
FIG. 2D is a schematic view of an alternative embodiment of the first and second stators of FIG. 2A in accordance with the present disclosure.
Figure 3:
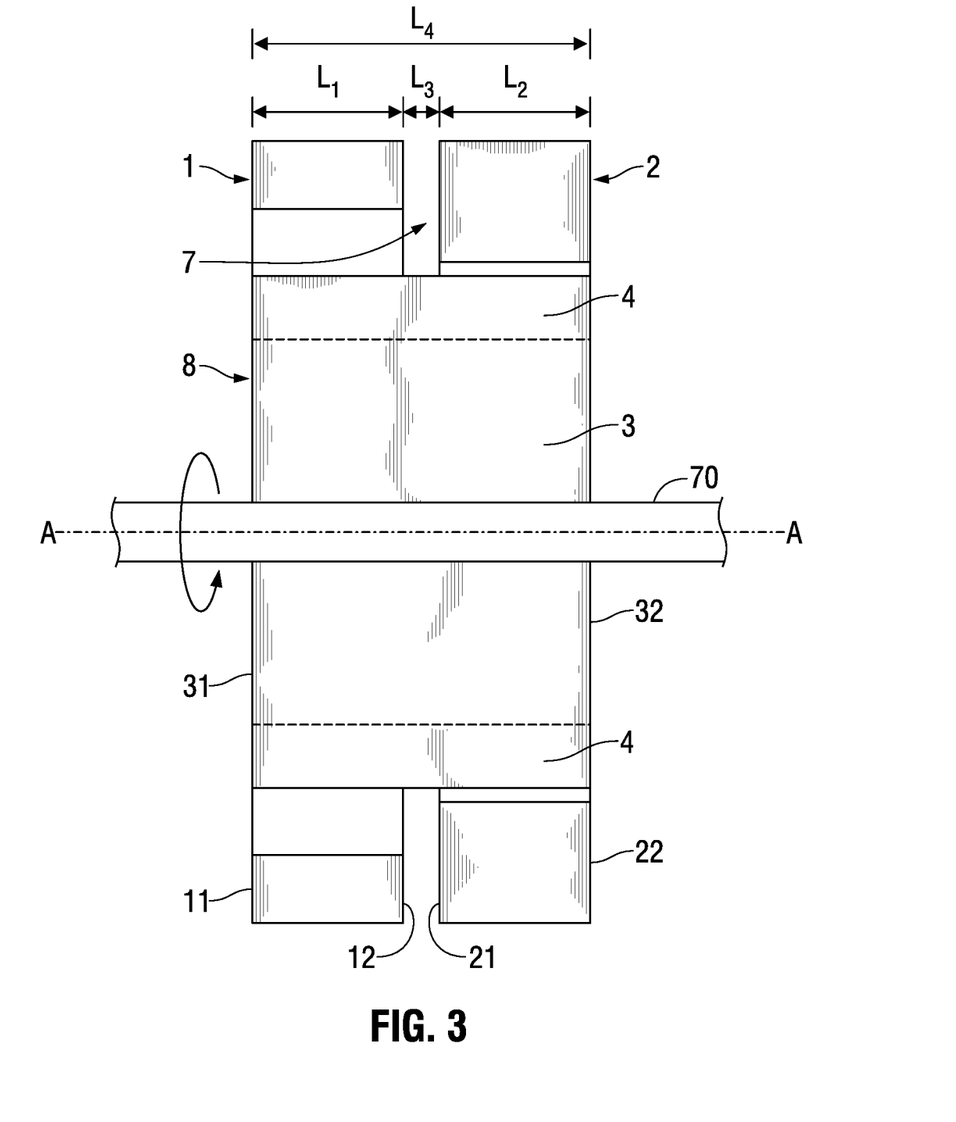
FIG. 3 is a cross-sectional view taken along line 3-3 of FIG. 2A in accordance with an embodiment of the present disclosure.

Referring to FIGS. 2A, 2B and 3, the rotor 8 includes a plurality of pole pieces 4 circumferentially located about a central portion 3 of the rotor 8. In FIGS. 2A, 2B and 3, the rotor field winding is omitted for simplicity. In an embodiment, the central portion 3 of the rotor 8 has a cylindrical shape. As depicted in FIGS. 2A and 2B, alternate pole pieces 4 of the rotor 8 are of a first magnetic polarity, e.g., north (N) polarity, while the other pole pieces 4 are of a second magnetic polarity, e.g., south (S) polarity, as the rotor 8 rotates.

The rotor 8 has a first end 31 and a second end 32. The first end 31 and the second end 32 may be spaced apart by any suitable length $L_4$. The rotor 8 has a longitudinal axis A-A between the first end 31 and the second end 32. The rotor 8 rotates (as indicated by the curved arrow in FIG. 3) about a shaft 70 along an axis of rotation, e.g., longitudinal axis A-A. The shaft 70 may be connected to or include a turbine shaft. In embodiments, the rotor pole pieces 4 are located at a fixed distance from the rotational axis. It is to be understood that the size, shape, and number of rotor pole pieces 4, and the relative spacing between pole pieces 4, may be varied from the configuration depicted in FIGS. 2A and 2B. Those skilled in the art will recognize that the size and shape of the rotor 8 will vary according to the number of poles on the dual stator 9.

In the dual-stator electrical generation apparatus 400, the dual stator 9 surrounds the circumference of the rotor 8. In embodiments, a first end portion of the rotor 8 (e.g., portion R1 shown in FIG. 8) is concentrically disposed within the first stator 1, and a second end portion of the rotor 8 (e.g., portion R2 shown in FIG. 8) is concentrically disposed within the second stator 2. During operation of the dual-stator electrical generation apparatus 400, the rotor 8 is rotated by a prime mover (not shown) via the shaft 70 so that a magnetic flux is induced in the first stator 1 and the second stator 2 of the dual stator 9, as described in more detail later in this description.

Referring now to FIG. 3, the first stator 1 has a first side 11 and a second side 12. The first side 11 and the second side 12 of the first stator 1 may be spaced apart by any suitable length $L_1$. The second stator 2 has a first side 21 and a second side 22. The first side 21 and the second side 22 of the second stator 2 may be spaced apart by any suitable length $L_2$. In an embodiment illustrated in FIG. 3, the second side 12 of the first stator 1 is disposed in opposing relation with the first side 21 of the second stator 2. Alternatively, the first stator 1 and the second stator 2 may be arranged such that the first side 11 of the first stator 1 is disposed in opposing relation with the second side 22 of the second stator 2.

In some embodiments, as shown for example in FIG. 3, the second side 12 of the first stator 1 are spaced apart from the second side of the second stator 2 by a gap 7 to prevent flux leakage. The gap 7 may have any suitable length $L_3$. In other embodiments, as shown for example in FIG. 10, the magnet poles of the first and second stators are at least partially interleafed with one another.

Figure 7:
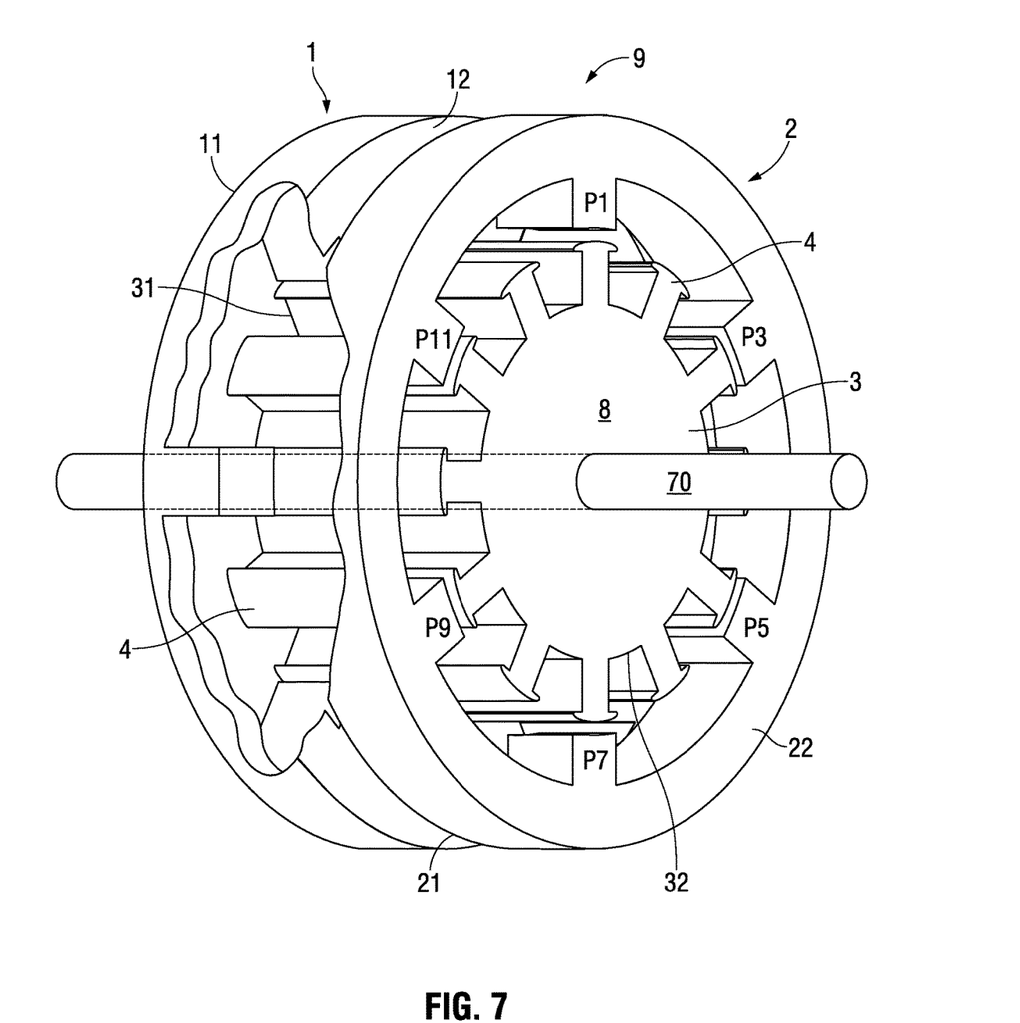
FIG. 7 is a perspective view of the first and second stators of the dual-stator electrical generation apparatus of FIG. 4, partially cut away to illustrate parts of the rotor, in accordance with an embodiment of the present disclosure.

In an embodiment, as shown for example in FIGS. 3 and 7, the first side 11 of the first stator 1 is aligned with the first end 31 of the rotor 8. The second side 22 of the second stator 2 may additionally, or alternatively, be aligned with the second end 32 of the rotor 8. In an embodiment, the length $L_4$ of the rotor 8 is defined by the sum of the length $L_1$ of the first stator 1, the length $L_2$ of the second stator 2 and the length $L_3$ of the gap 7. In the preferred embodiment, the length $L_3$ of the gap 7 is minimal so that the length $L_4$ of the rotor 8 is minimized, e.g., to reduce fabrication cost, to reduce weight of the rotor, which helps to reduce the size of the shaft and bearings, to reduce the cost of ownership, and/or to facilitate easier transport and installation.

The first stator 1 and the second stator 2 each include a plurality of poles circumferentially located about the longitudinal axis A-A and proximal to the plurality of pole pieces 4. In more detail, the first stator 1 and the second stator 2 each consists of a ring-shaped portion with a plurality of poles protruding from the inner periphery of the ring, such that the poles of the first stator 1 and the second stator 2, respectively, match every other pole piece 4 on the rotor 8. In some embodiments, the stator poles may have rectangular or square geometries. Those skilled in the art will recognize that the stator poles may have other geometries, e.g., a trapezoidal geometry. The plurality of magnetic poles of the first stator 1 may be disposed at angular intervals on an inner circumference of the first stator 1. The plurality of magnetic poles of the second stator 2 may be disposed at angular intervals on an inner circumference of the second stator 2. In embodiments, the plurality of magnet poles of the first stator 1 are rotated 180 electrical degrees with respect to the plurality of magnet poles of the second stator 2.

In an embodiment, as shown for example in FIG. 2, the dual stator 9 includes twelve poles, of which the first stator 1 includes six poles P2, P4, P6, P8, P10 and P12 and the second stator 2 includes six poles P1, P3, P5, P7, P9 and P11. The first stator 1 and the second stator 2 require no windings, making for lower cost of fabrication. It is to be understood that the dual stator 9 may be segmented into any suitable number of poles and should not be construed to be limited to only twelve poles.

In FIG. 2A, the poles P2, P4, P6, P8, P10 and P12 of the first stator 1 are aligned with the south (S) polarity poles 4 of the rotor 8, and the poles P1, P3, P5, P7, P9 and P11 of the second stator 2 are aligned with the north (N) polarity poles 4 of the rotor 8. In FIG. 2B, the poles P2, P4, P6, P8, P10 and P12 of the first stator 1 are aligned with the north (N) polarity poles 4 of the rotor 8, and the poles P1, P3, P5, P7, P9 and P11 of the second stator 2 are aligned with the south (S) polarity poles 4 of the rotor 8.

Figure 5:
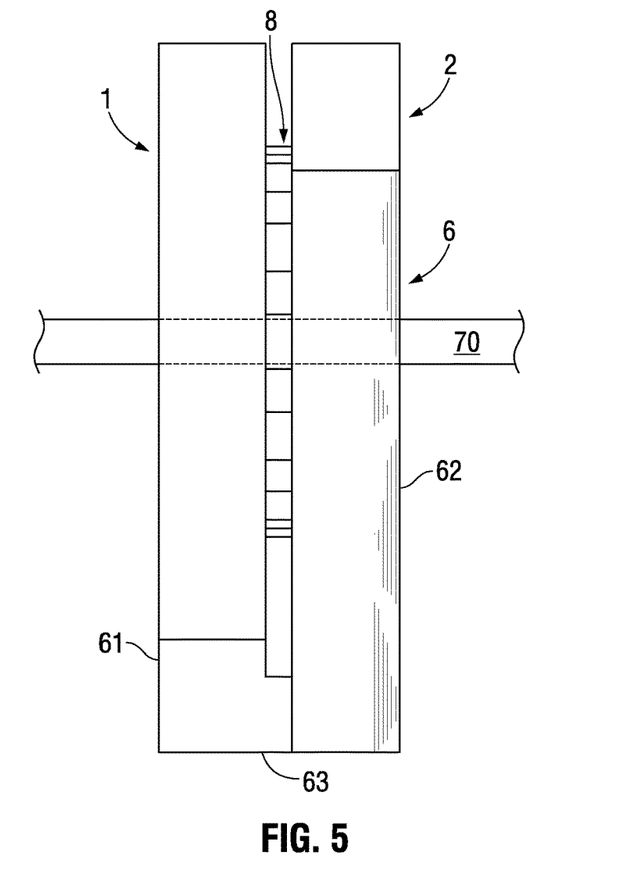
FIG. 5 is a cross-sectional view taken along line 5-5 of FIG. 4 in accordance with an embodiment of the present disclosure.
Figure 6:
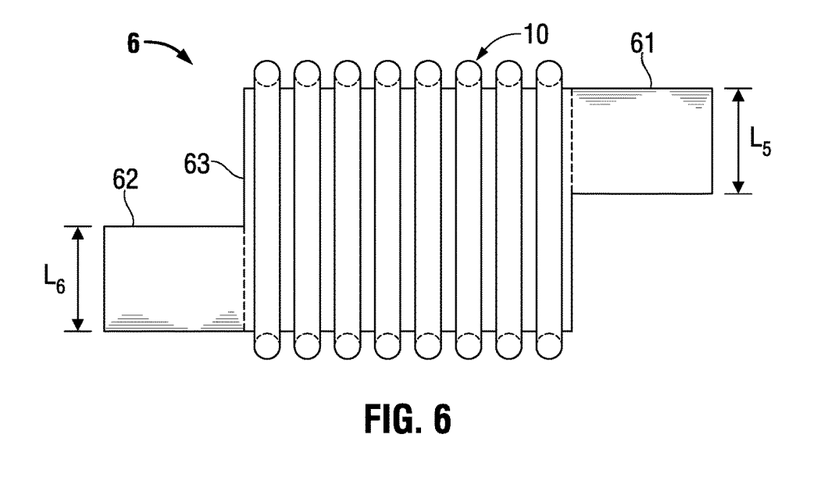
FIG. 6 is a cross-sectional view taken along line 6-6 of FIG. 4 in accordance with an embodiment of the present disclosure.

Referring to FIGS. 4-8, the dual-stator electrical generation apparatus 400 includes an output coil bridge 6 associated with the dual stator 9. Referring, in particular, to FIGS. 5 and 6, the output coil bridge 6 includes a first portion 61 associated with the first stator 1, a second portion 62 associated with the second stator 2, and a third portion 63 disposed between and magnetically coupling the first portion 61 and the second portion 62. The third portion 63 of the output coil collects flux from the first stator 1 and the second stator 2 as the rotor 8 rotates, supplying the output coil with AC flux. FIG. 6 shows an output coil 10 is wound onto the third portion 63 of the output coil bridge 6. The output coil 10 is omitted on the cross-sectional view in FIG. 5.

In an alternative embodiment shown in FIG. 2C, the first stator 1 has an edge portion 51 to allow for attachment of the first stator 1 to the first portion 61 of the output coil bridge 6, and the second stator 2 has an edge portion 52 to allow for attachment of the second stator 2 to the second portion 62 of the output coil bridge 6. In an alternative embodiment shown in FIG. 2D, the first stator 1 has a tab member 71 to allow for attachment of the first stator 1 to the first portion 61 of the output coil bridge 6, and the second stator 2 has a tab member 72 to allow for attachment of the second stator 2 to the second portion 62 of the output coil bridge 6. Those skilled in the art will recognize that the first stator 1 and the second stator 2 may be mechanically supported in a variety of ways.

Figure 8:
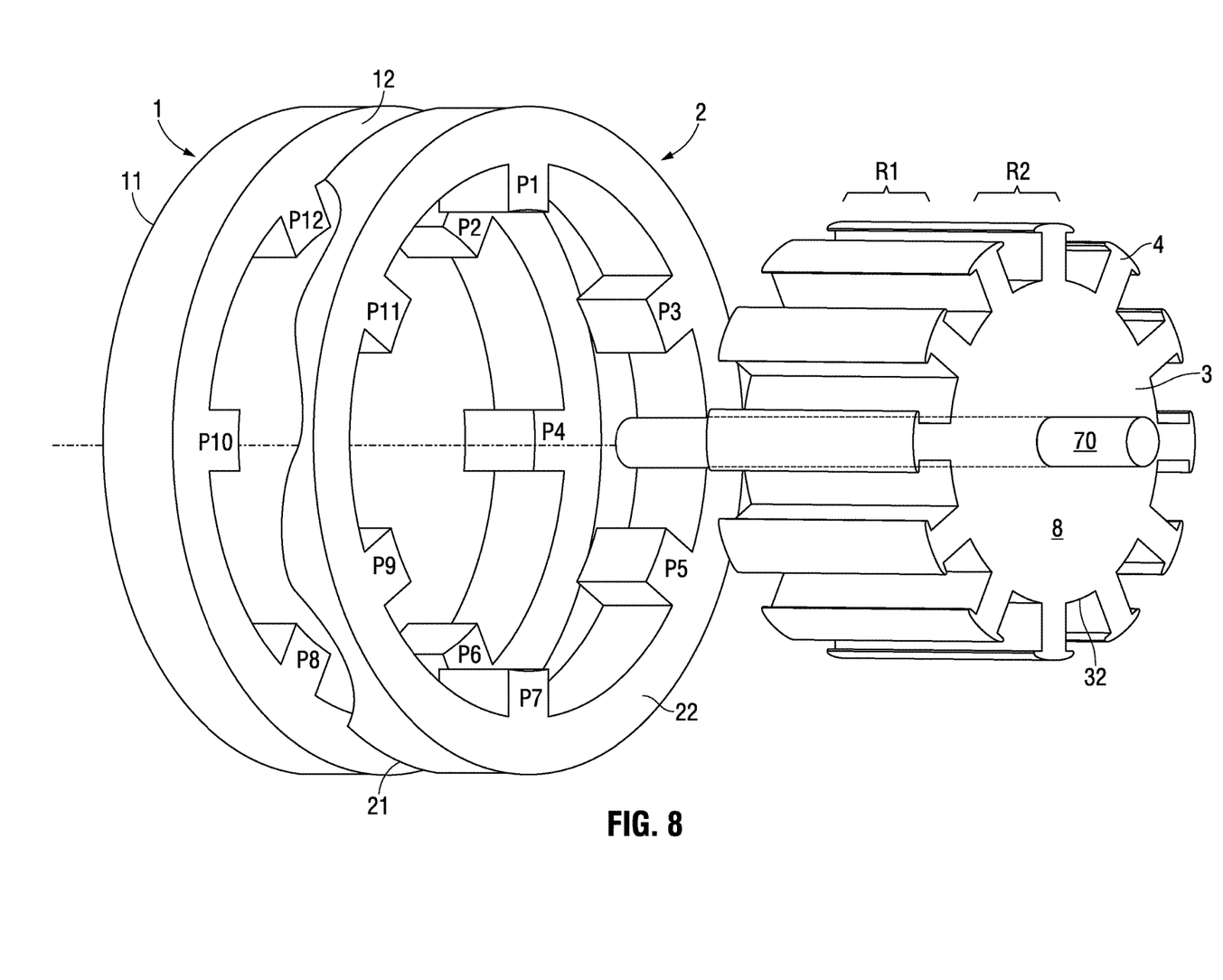
FIG. 8 is a perspective view of the rotor and first and second stators of the dual-stator electrical generation apparatus of FIG. 4, shown separated, and partially cut away to illustrate parts of the first stator, in accordance with an embodiment of the present disclosure.

In as embodiment, as shown for example in FIGS. 7 and 8, the first stator 1 is located about a first end portion R1 of the rotor 8, and the second stator 2 is located about a second end portion R2 of the rotor 8. The dual stator 9 is magnetically coupled to the output coil bridge 6 and adjusted so that the poles P2, P4, P6, P8, P10 and P12 of the first stator 1 match half of the poles 4 on the rotor 8 (i.e., alternating poles) and the poles P1, P3, P5, P7, P9 and P11 of the second stator 2 match the other half of the poles 4 of the rotor 8.

During operation of the dual-stator electrical generation apparatus 400, as the rotor 8 rotates, the first stator 1 will receive the magnetic flux of all the first magnetic polarity, e.g., north (N) polarity, poles 4 of the rotor 8, and the second stator 2 will receive all of the magnetic flux of the second magnetic polarity, e.g., south (S) polarity, poles 4 of the rotor 8. Thus, as the rotor 8 rotates, the magnetic flux of all the first magnetic polarity flows, alternately, from the first stator 1 to the second stator 2, and the magnetic flux of all the second magnetic polarity flows, alternately, from the second stator 2 to the first stator 1. In more detail, the magnetic flux flows or shifts, alternately, from a first configuration (e.g., shown in FIG. 2A), in which the poles of the first stator 1 are aligned with the south (S) polarity poles 4 of the rotor 8, and the poles of the second stator 2 are aligned with the north (N) polarity poles 4 of the rotor 8, to a second configuration (e.g., shown in FIG. 2B), in which the poles of the first stator 1 are aligned with the north (N) polarity poles 4 of the rotor 8, and the poles of the second stator 2 are aligned with the south (S) polarity poles 4 of the rotor 8. As such, the first stator 1 and the second stator 2 of the dual stator 9 effectively become the accumulators of the magnetic flux.

The magnetic flux collected by the first stator 1 and the second stator 2 is directed to the output coil 10, via the output coil bridge 6 associated with the first stator 1 and the second stator 2, to generate AC voltage at the output. The output coil 10 functions similar to the secondary coil on a transformer. The output voltage from the output coil 10 is output via transmission lines 14 and 15. The output coil 10 could be replaced by any device requiring an alternating field, such as, for example, a shaded pole induction motor.

Figure 9:
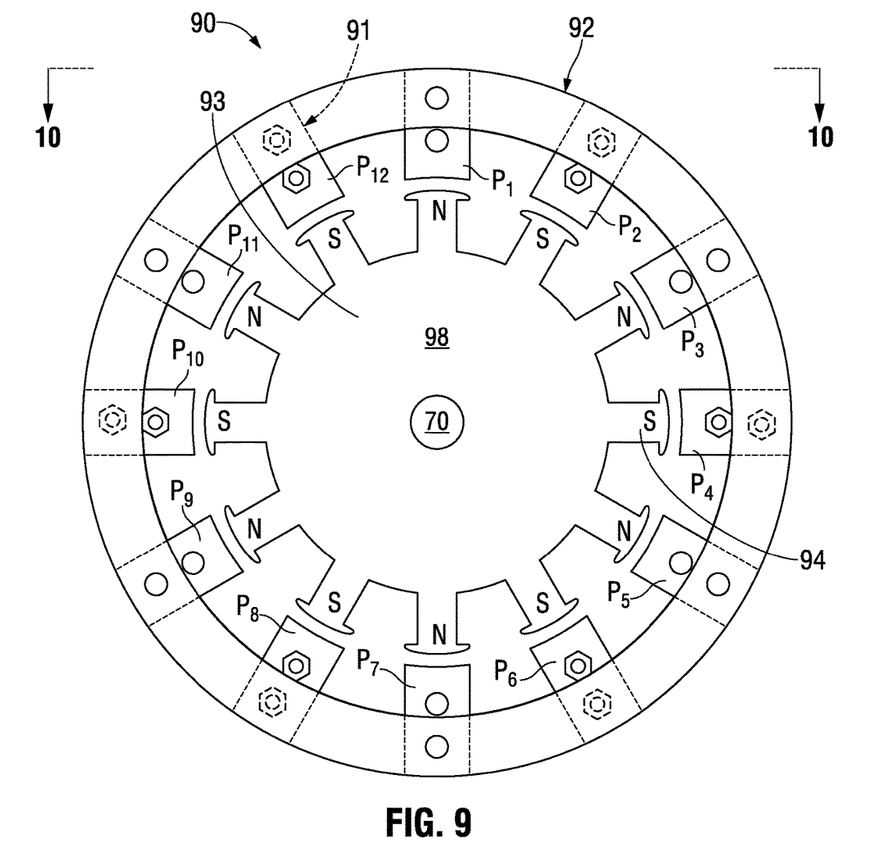
FIG. 9 is a schematic view of a rotor and first and second stators of a dual-stator electrical generation apparatus in accordance with another embodiment the present disclosure.
Figure 10:
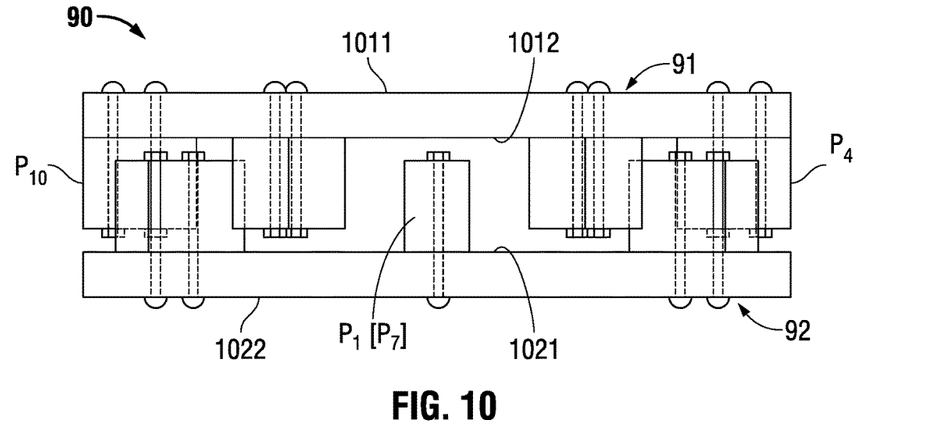
FIG. 10 is a cross-sectional view taken along the line 10-10 of FIG. 9 in accordance with an embodiment the present disclosure.
Figure 11:
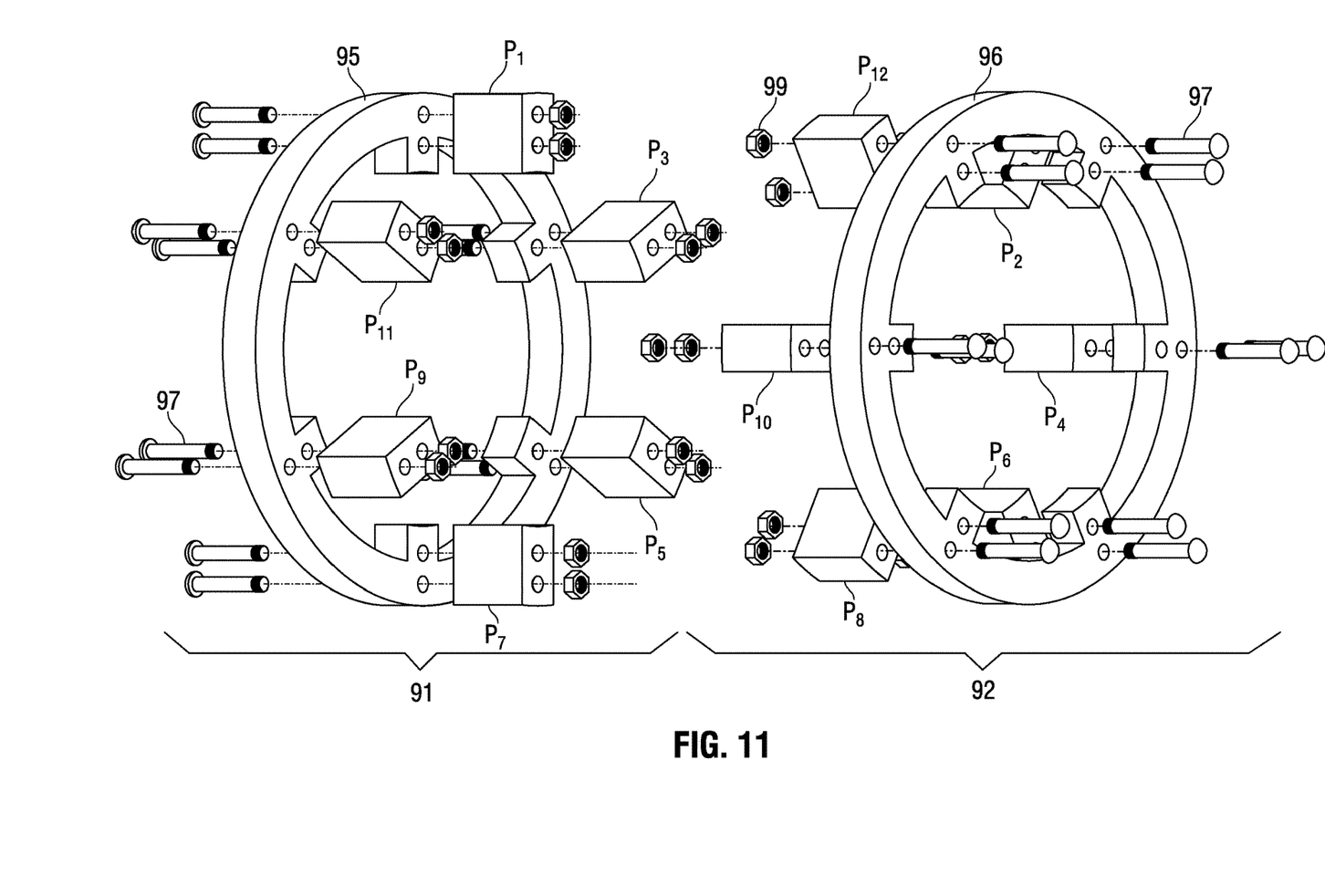
FIG. 11 is a perspective view of the first and second stators of FIG. 10, shown with parts separated, in accordance with an embodiment of the present disclosure.

Referring to FIGS. 9-11, an embodiment of a dual stator 90 is shown for use with a rotor 98. In FIG. 9, the rotor field winding is omitted for simplicity. The dual stator 90 comprises a first stator 91 and a second stator 92. The first stator 91 and the second stator 92 require no windings. The rotor 98 and the dual stator 90, or portions thereof, may be fabricated out of electrical steel, e.g., to improve the magnetic flux strength and reduce hysteresis loss. As depicted in FIG. 9, alternate pole pieces 94 of the rotor 8 are of a first magnetic polarity, e.g., north (N) polarity while the other pole pieces 94 are of a second magnetic polarity, e.g., south (S) polarity, as the rotor 98 rotates.

The first stator 91 has a first side 1011 and a second side 1012. The second stator 92 has a first side 1021 and a second side 1022. In an embodiment, as shown for example in FIG. 10, the second side 1012 of the first stator 91 is disposed in opposing relation with the first side 1021 of the second stator 92. Alternatively, the first stator 1 and the second stator 92 may be arranged such that the first side 1011 of the first stator 91 is disposed in opposing relation with the second side 1022 of the second stator 92.

The dual stator 90 includes twelve poles, as best seen in FIGS. 9 and 11, of which the first stator 91 includes six poles $P_2$, $P_4$, $P_6$, $P_8$, $P_{10}$ and $P_{12}$ and the second stator 92 includes six poles $P_1$, $P_3$, $P_5$, $P_7$, $P_9$ and $P_{11}$. In an embodiment, the poles $P_2$, $P_4$, $P_6$, $P_8$, $P_{10}$ and $P_{12}$ of the first stator 91 and the poles $P_1$, $P_3$, $P_5$, $P_7$, $P_9$ and $P_{11}$ of the second stator 92 are constructed from thin lamination sheets stacked together, e.g., to reduce eddy current losses. It is to be understood that the dual stator 90 may be segmented into any suitable number of poles and should not be construed to be limited to only twelve poles. In an embodiment, as shown for example in FIG. 11, the poles $P_2$, $P_4$, $P_6$, $P_8$, $P_{10}$ and $P_{12}$ the first stator 91 and the poles $P_1$, $P_3$, $P_5$, $P_7$, $P_9$ and $P_{11}$ of the second stator 92 are separate components. In an embodiment, the poles $P_2$, $P_4$, $P_6$, $P_8$, $P_{10}$ and $P_{12}$ are attached to the ring-shaped portion 95 of the first stator 91 using threaded fasteners 97 and nuts 99, and the poles $P_1$, $P_3$, $P_5$, $P_7$, $P_9$ and $P_{11}$ are attached to the ring-shaped portion 95 of the second stator 92 using threaded fasteners 97 and nuts 99. Those skilled in the art will recognize that the poles of the first stator 91 and the poles of the second stator 92 may be attached in a variety of ways.

In an embodiment, the dual stator 90 may be magnetically coupled to the output coil bridge 6 and adjusted so that the poles $P_2$, $P_4$, $P_6$, $P_8$, $P_{10}$ and $P_{12}$ of the first stator 91 match half of the poles on the rotor 98 (i.e., alternating poles) and the poles $P_1$, $P_3$, $P_5$, $P_7$, $P_9$ and $P_{11}$ of the second stator 92 match the other half of the poles of the rotor 98. During operation, as the rotor 98 rotates, the first stator 91 will receive the magnetic flux of all the first magnetic polarity, e.g., north (N) polarity, poles of the rotor 98, and the second stator 92 will receive all of the magnetic flux of the second magnetic polarity, e.g., south (S) polarity, poles of the rotor 98.

FIG. 12 shows an embodiment of a three-phase, dual-stator electrical generation apparatus 1200. In FIG. 12, the rotor field winding is omitted for simplicity. Various parts of the dual-stator electrical generation apparatus 1200 may be formed of any of a variety of materials, including metallic and/or non-metallic materials. One or more parts of the dual-stator electrical generation apparatus 1200 may be constructed from electrical steel laminations.

The dual-stator electrical generation apparatus 1200 includes a first dual stator 1290A, which includes stators 14A and 15A, a second dual stator 1290B, which includes stators 14B and 15B, and a third dual stator 1290C, which includes stators 14C and 15C. The first dual stator is magnetically coupled to a first output coil bridge 16A, the second dual stator 1290B is magnetically coupled to a second output coil bridge 16B, and the third dual stator 1290C is magnetically coupled to a third output coil bridge 16C. It is to be understood that the armature may be segmented into any suitable number of poles and should not be construed to be limited to only twenty-one poles.

The first output coil bridge 16A has a first output coil 12A. The output voltage from the first output coil 12A is output via transmission line A. The second output coil bridge 16B has a second output coil 12B. The output voltage from the second output coil 12B is output via a transmission line B. The third output coil bridge 16C has a third output coil 12C. The output voltage from the third output coil 12C is output via a transmission line C. The first output coil bridge 16A, the second output coil bridge 16B, and the third output coil bridge 16C are similar to the output coil bridge 6 shown in FIGS. 4-6 and further description of like elements is omitted in the interests of brevity.

The dual-stator electrical generation apparatus 1200 includes a rotor 1208, which is disposed within the split armature to generate a magnetic field. In an embodiment, the rotor 1208 includes 24 pole pieces 1204 circumferentially located about a central portion 1203 of the rotor 1208. Alternate pole pieces 1204 of the rotor 1208 are of a first magnetic polarity, e.g., north polarity, while the other pole pieces 1204 are of a second magnetic polarity, e.g., south polarity, as the rotor 8 rotates. It is to be understood that the size, shape, and number of rotor poles, and the relative spacing between rotor poles, may be varied from the configuration depicted in FIG. 12. Those skilled in the art will recognize that the size and shape of the rotor 1208 will vary according to the number of poles on the first dual stator, the second dual stator, and the third dual stator.

Although embodiments have been described in detail with reference to the accompanying drawings for the purpose of illustration and description, it is to be understood that the disclosed systems and apparatus are not to be construed as limited thereby. It will be apparent to those of ordinary skill in the art that various modifications to the foregoing embodiments may be made without departing from the scope of the disclosure. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus for converting mechanical energy into electrical energy, comprising:
a rotor with an even number of electromagnetic poles of alternating polarity along a circumference of the rotor, each of the electromagnetic poles extending an entire axial length of the rotor and having a single polarity;
a first stator ring defined by a plurality of radially inward magnet poles grouped into a plurality of sets circularly spaced apart from each other; and
a second stator ring defined by a plurality of radially inward magnet poles grouped into a plurality of sets circularly spaced apart from each other and parallel to the first stator ring;
wherein the rotor is positioned within the first stator ring and the second stator ring, the second stator ring being spaced axially apart from the first stator ring with flux leakage being reduced based upon an axial spatial separation of the first stator ring and the second stator ring, and the first stator ring being rotationally offset from the second stator ring with the magnet poles of the first stator ring radially facing a first set of alternating electromagnet poles of the rotor, the magnet poles of the second stator ring radially facing a different second set of alternating electromagnet poles of the rotor, and each of sets of radially inward magnet poles for both the first stator ring and the second stator ring corresponding to a specific phase of an electrical energy wave.

2. The apparatus of claim 1, wherein the magnet poles of the first stator ring face the north magnet poles of the rotor and the magnet poles of the second stator ring face the south magnet poles of the rotor.

3. The apparatus of claim 2, wherein the north magnet poles of the rotor generate a north polarity flux to the first stator ring and the south magnet poles of the rotor generate a south polarity flux to the second stator ring, the respective polarity flux to the accumulator rings being reversed as the rotor advances.

4. The apparatus of claim 3, wherein the north polarity flux and the south polarity flux oscillate as a function of a number of magnet poles of the rotor and a speed of rotation.

5. The apparatus of claim 3, further comprising:
a ferromagnetic connector between the first stator ring and the second stator ring; and
a coil wrapped around the ferromagnetic connector;
wherein the oscillating flux from the first stator ring and the second stator ring generate a voltage at an output of the coil.

6. The apparatus of claim 5, wherein each of the electromagnetic poles of the rotor include a winding.

7. The apparatus of claim 1, wherein a number of revolutions per minute of turning the rotor is reduced as a function of a number increasing the electromagnetic poles of the rotor for a given rotor diameter, total flux, and torque remaining the same and the power output remaining the same.

8. The apparatus of claim 1, wherein the rotor is defined by a first axial end and an opposed second axial end.

9. The apparatus of claim 8, wherein the magnet poles of the first stator ring face the electromagnetic poles of the rotor proximal to the first axial end thereof, and the magnet poles of the second stator ring face the electromagnetic poles of the rotor proximal to the second axial end thereof.

10. The apparatus of claim 8, wherein the voltage at the output of the coil corresponds to a level of electrical current through the winding of the electromagnetic poles of the rotor.

11. A magnetic alternating current generator comprising:

a rotor with a predefined number of electromagnetic poles of alternating polarity along a circumference of the rotor, each of the electromagnetic poles extending an entire axial length of the rotor;

one or more first stator ring segments each defined by a plurality of radially inward magnet poles; and one or more second stator ring segments each defined by a plurality of radially inward magnet poles and parallel to the first stator ring;

ferromagnetic connectors between each of the respective first stator ring segments and the corresponding one of the second stator ring segments; and coils wrapped around each of the ferromagnetic connectors, an oscillating flux from a given one of the first stator ring segments and the corresponding one of the second stator ring segments generate a phase of a voltage signal at an output of the respective coils;

wherein the rotor is positioned within a circular arrangement of the one or more first stator ring segments and a circular arrangement of the one or more second stator ring segments, each of the first stator ring segments being spaced axially apart from corresponding one of the second stator ring segments with flux leakage being reduced based upon an axial spatial separation of each of the respective first stator ring segments and the corresponding one of the second stator ring segments, and each of the first stator ring segments being rotationally offset from the corresponding one of the second stator ring segments.

* * * * *